United States Patent [19]

McCartney

[11] Patent Number: 5,905,623
[45] Date of Patent: *May 18, 1999

[54] TELEPHONE AND DATA OVERVOLTAGE PROTECTION APPARATUS INCLUDING A LONGITUDINAL TRANSFORMER

[75] Inventor: Thomas McCartney, Lake Bluff, Ill.

[73] Assignee: Oneac Corporation, Libertyville, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/863,488

[22] Filed: May 27, 1997

[51] Int. Cl.$^6$ .................................................. H02H 3/20
[52] U.S. Cl. ........................................... 361/119; 361/113
[58] Field of Search .............................. 361/91, 111, 113, 361/117, 119, 56

[56] References Cited

U.S. PATENT DOCUMENTS

| | | | |
|---|---|---|---|
| 3,571,658 | 3/1971 | Knoth | 361/35 |
| 3,725,613 | 4/1973 | Allen et al. | 179/175.3 |
| 3,824,431 | 7/1974 | Schlicke | 361/126 |
| 3,852,539 | 12/1974 | DeLuca | 179/174 |
| 3,944,753 | 3/1976 | Proctor et al. | 179/840 F |
| 3,950,676 | 4/1976 | Dornseifer et al. | 361/40 |
| 3,961,227 | 6/1976 | DeLuca et al. | 361/42 |
| 4,021,760 | 5/1977 | Campi | 333/70 R |
| 4,039,763 | 8/1977 | Angner et al. | 179/99 |
| 4,079,211 | 3/1978 | Janssen | 179/81 R |
| 4,095,163 | 6/1978 | Montague | 323/8 |
| 4,156,838 | 5/1979 | Montague | 323/8 |
| 4,203,006 | 5/1980 | Mascia | 179/2 C |
| 4,238,812 | 12/1980 | Middleman et al. | 361/106 |
| 4,254,442 | 3/1981 | Dijkmans et al. | 361/56 |
| 4,329,726 | 5/1982 | Middleman et al. | 361/58 |
| 4,434,396 | 2/1984 | Montague | 323/230 |
| 4,455,586 | 6/1984 | McCartney | 361/56 |
| 4,586,104 | 4/1986 | Standler | 361/91 |
| 4,630,163 | 12/1986 | Cooper et al. | 361/56 |
| 4,751,607 | 6/1988 | Smith | 361/119 |
| 4,758,920 | 7/1988 | McCartney | 361/119 |
| 4,887,180 | 12/1989 | Climent et al. | 361/91 |
| 4,941,063 | 7/1990 | McCartney et al. | 361/119 |
| 4,991,051 | 2/1991 | Hung | 361/111 |
| 5,142,430 | 8/1992 | Anthony | 361/56 |
| 5,416,663 | 5/1995 | Atkins | 361/119 |

OTHER PUBLICATIONS

PROTECTION OF ELECTRONIC CIRCUITS FROM OVERVOLTAGES, Ronald B. Standler, 1989, pp. 176–177 and 246–247.

*Primary Examiner*—Sally C. Medley
*Attorney, Agent, or Firm*—Mason, Kolehmainen, Rathburn and Wyss; Joan Pennington

[57] ABSTRACT

A method and apparatus are provided for protecting a pair of telephone lines and similar data communication channels from overvoltage and transients. A filter for filtering noise and transient voltage signals above desired data signals on telephone lines and similar data communication channels includes a longitudinal transformer. The longitudinal transformer includes a single transformer core and a pair of coils. A first one of the coils is connected in series with a first telephone line or a first similar data communication channel. A second one of the coils is connected in series with a second telephone line or a second similar data communication channel. The pair of coils are substantially identical; each coil having an identical number of turns. A high impedance is provided with the longitudinal transformer to noise and transient voltage signals above desired data signals. A low impedance is provided with the longitudinal transformer to desired data signals.

12 Claims, 3 Drawing Sheets

TELEPHONE AND DATA OVERVOLTAGE PROTECTION APPARATUS INCLUDING A LONGITUDINAL TRANSFORMER

FIELD OF THE INVENTION

This invention relates generally to an overvoltage protection circuit for a pair of telephone lines and similar data communication channels and, more particularly, to circuitry for filtering noise and transient voltage signals above data signals on the lines or channels including a longitudinal transformer.

DESCRIPTION OF THE PRIOR ART

Various arrangements have been used for protecting telephone equipment against hazardous voltages due to lightning or power surges. However, conventional arrangements are effective for clamping transient voltages at a rated potential above the ring signal of conventional telephone systems. The typical ring signal is about 170 volts AC peak with a frequency between 15 and 30 hertz so that the conventional arrangements have a rated clamping voltage of approximately 200 volts or higher. Consequently, such arrangements are ineffective for filtering noise and transient voltage signals occurring below this standard clamping voltage.

Overvoltage protection circuitry that overcomes many of the disadvantages of the prior art is disclosed in McCartney, U.S. Pat. No. 4,758,920, issued Jul. 19, 1988 and assigned to the same assignee of the present invention and in McCartney et al., U.S. Pat. No. 4,941,063, issued Jul. 19, 1988 and assigned to the same assignee of the present invention. Overvoltage protection circuits are disclosed for coupling a subscriber's station to first and second conductors connected to a telephone system or other similar communications source. The overvoltage protection circuits include first circuitry connected between the first and second conductors for conducting current at a first breakdown voltage and for blocking current below the first breakdown voltages; second circuitry for conducting current at a second breakdown voltage and for blocking current below the second breakdown voltage; and circuitry connected in series between the first and second circuitry for filtering voltage signals on the first and second conductors responsive to the second circuitry conducting current. The disclosed improved overvoltage protection circuitry is generally illustrated in FIG. 1.

As shown in FIG. 1 the first clamping means, clamp 1, is a crowbar device, such as a gas discharge tube or a pair of bi-directional solid sate crowbar clamping diodes typically having at least a 300V stand off voltage rating. The second clamping means, clamp 2 is a bi-directional solid state transient voltage suppressor or bi-directional solid state Zener diode or a device type sold by General Semiconductor Industries, Inc. under the trademark TranZorb. Alternatively, the second clamping means, clamp 2 is a bi-directional solid state crowbar clamping diode having a stand off voltage, typically 5–70 volts, above the maximum signal or data voltage but below the other system operating voltages, for example, the ring voltage or DC loop voltage. Series Z, forms the series element of a low pass filter. This is usually either a resistor, for example, 10 Ω resistor or an inductor or a combination of a resistor and an inductor. Shunt Z forms the shunt element of the low pass filter. Shunt Z is usually a capacitor, for example, 0.33 $\mu$F.

In the known arrangement of FIG. 1, the individual series impedance elements, series Z, causes unwanted attenuation of the desired signal, forming an attenuator with the system termination impedance. This unwanted attenuation effect places a limitation on the magnitude of the series impedance elements. The shunt capacitor value is limited by other system considerations to typically less than 1 $\mu$F and preferably less than 0.5 $\mu$F.

A low value of series impedance can cause the transient voltage across the first clamping means to be held down below the firing voltage when the second clamp conducts. This effect is the result of the source impedance of the transient which increases as the transient originates farther down the line. Increasing the individual series impedance element values to alleviate this effect would be in conflict with the system low impedance requirement.

A need exists for an improved circuitry for filtering noise and transient voltage signals above data signals on telephone lines and similar data communication channels, and that avoids the disadvantages of the known arrangements.

SUMMARY OF THE INVENTION

A principal object of the present invention is to provide an improved method and apparatus for protecting a pair of telephone lines and similar data communication channels from overvoltage and transients. Other objects are to provide such improved method and apparatus substantially without negative effects, and that overcome many of the disadvantages of prior art arrangements.

In brief, a method and apparatus are provided for protecting a pair of telephone lines and similar data communication channels from overvoltage and transients. A filter for filtering noise and transient voltage signals above desired data signals on telephone lines and similar data communication channels includes a longitudinal transformer. The longitudinal transformer includes a single transformer core and a pair of coils. A first one of the coils is connected in series with a first telephone line or a first similar data communication channel. A second one of the coils is connected in series with a second telephone line or a second similar data communication channel. The pair of coils are substantially identical; each coil having an identical number of turns. A high impedance is provided with the longitudinal transformer to noise and transient voltage signals above desired data signals. A low impedance is provided with the longitudinal transformer to desired data signals.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
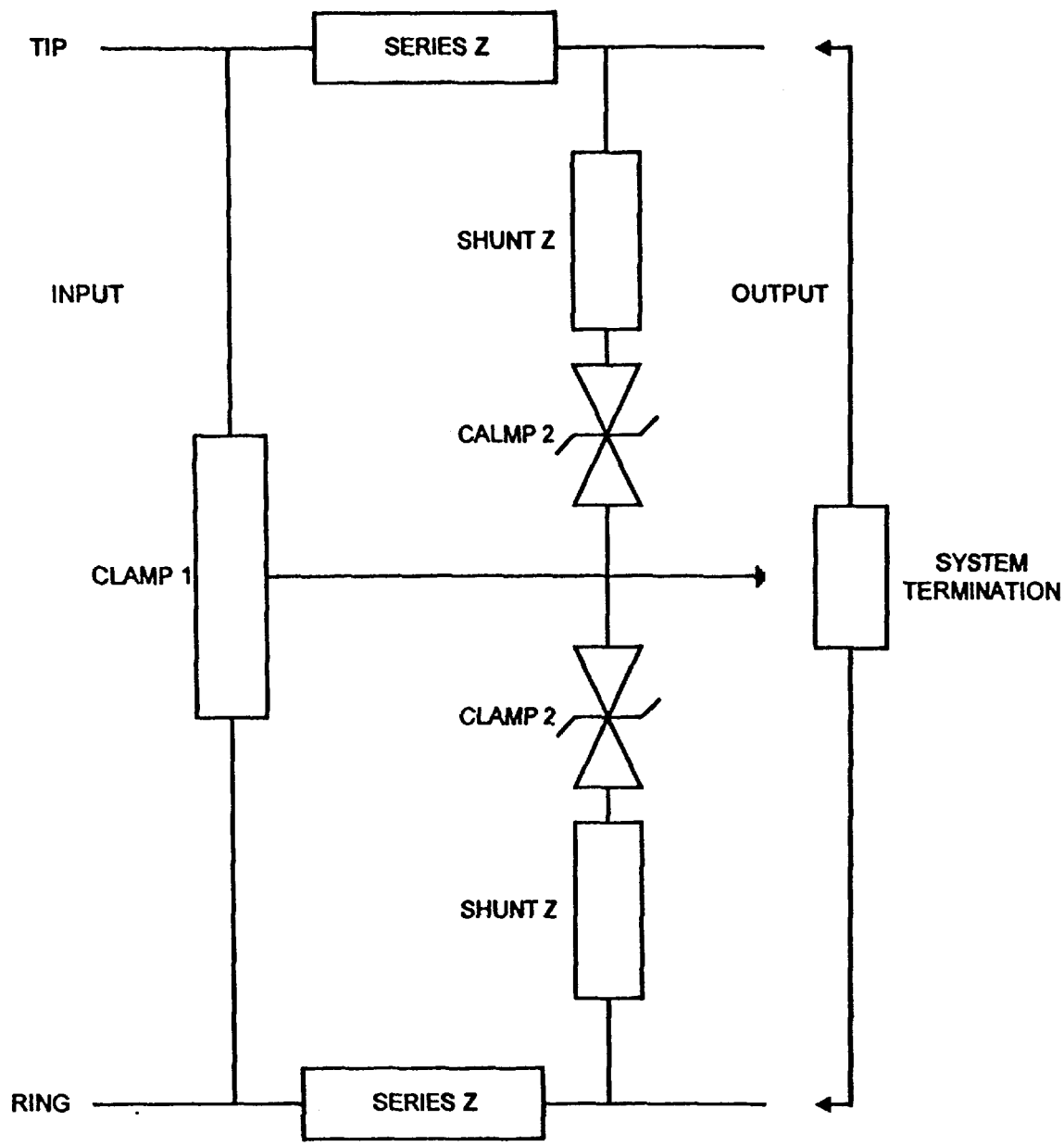
FIG. 1 is a schematic diagram illustrating a prior art overvoltage protection circuit.
Figure 2:
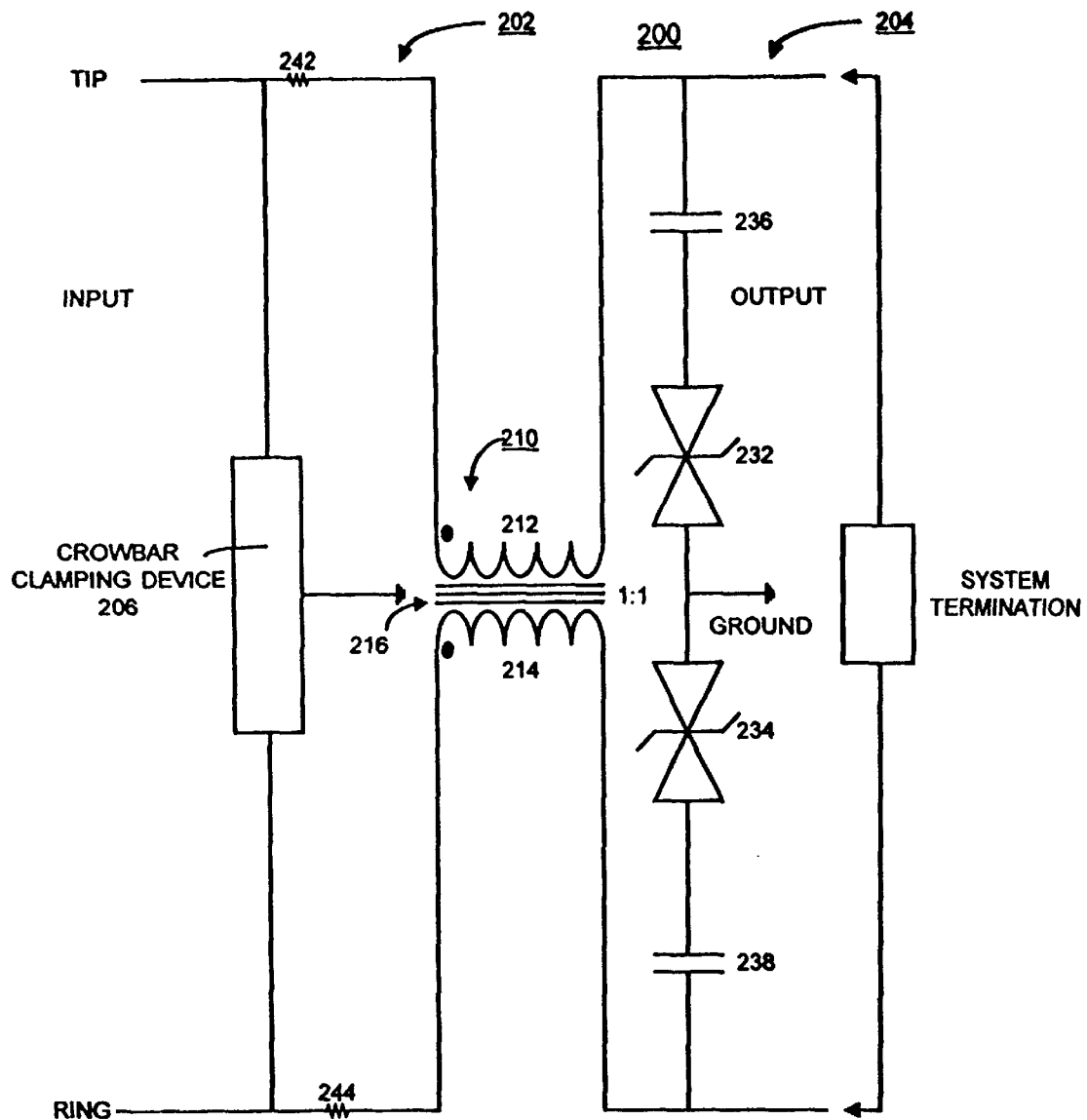
FIG. 2 is a schematic diagram illustrating an overvoltage protection circuit arranged in accordance with principles of the present invention.
Figure 3:
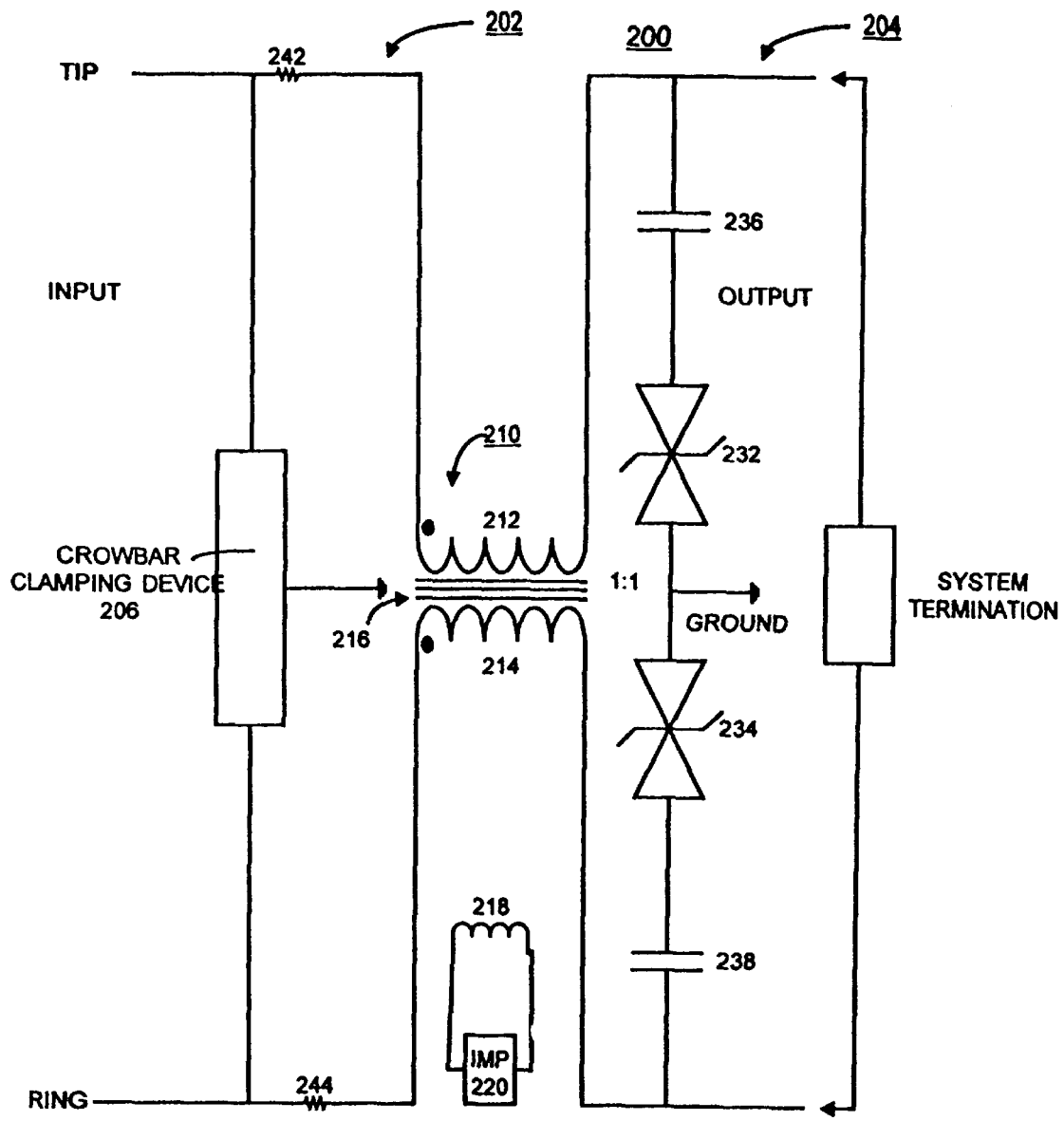
FIG. 3 is a schematic diagram illustrating an alternative overvoltage protection circuit arranged in accordance with principles of the present invention.

Having reference now to the drawings, in FIGS. 2 and 3, there are shown an overvoltage protection circuits generally designated by the reference character 200 and arranged in accordance with principles of the present invention. The overvoltage protection circuits 200 include first circuitry generally designated by 202 coupled to an INPUT and second clamping circuitry generally designated by 204 coupled to an OUTPUT or SYSTEM TERMINATION. The first clamping circuitry 202 includes a crowbar device 206, such as a gas discharge tube or a pair of bidirectional solid sate crowbar clamping diodes typically having at least a 300V stand off voltage rating. The overvoltage protection circuits 200 include a longitudinal transformer generally designated by the reference character 210 and arranged in accordance with principles of the present invention.

In accordance with features of the invention, a high impedance is provided with the longitudinal transformer 210 to noise and transient voltage signals above desired data signals. A low impedance is provided with the longitudinal transformer 210 to desired data signals. The longitudinal transformer 210 includes a pair of coils 212 and 214 and a single transformer core 216. A first one of the coils 212 is connected in series with a first telephone line (TIP) or a first similar data communication channel. A second one of the coils 214 is connected in series with a second telephone line (RING) or a second similar data communication channel. The pair of coils 212, 214 are substantially identical. Each coil 212 and 214 has an identical number of turns and are wound in the same direction on the single transformer core 216.

The two windings 212 and 214 of the longitudinal transformer 210 having equal turns are provided in close proximity on the common core 216 in order to reduce leakage inductance. The common core 216 is formed of ferrite or other magnet core material. The windings 212 and 214 are phased so that tip and ring currents flowing through the two windings in the same direction to ground via capacitors 236 and 238 or longitudinal currents result in additive magnetic fluxes in the core 216. Tip and ring current flowing in opposite directions in the two windings 212 and 214, for example the desired data signals or signal loop current, to produce a net zero magnetic flux in the core 216. The longitudinal transformer 210 has a high impedance to overvoltage and transient signals between TIP line and GROUND and RING line and GROUND, and has a very low impedance to the desired loop signals.

Actual longitudinal impedance of the longitudinal transformer 210 depends on the number of winding turns of windings 212 and 214 and characteristics of core 216. As shown in FIG. 3, a third winding 218 can be used with a shunt impedance 220 also be tailored by shunting one or both windings with impedances or an impedance, including for example, a resistor, a capacitor and an inductor or a combination thereof, across a third winding 218 on the core 216. The third winding 218 has a selected number of turns, not necessarily of the same turns as the other two windings 212 and 214. Loop DC current produces a net zero ampere turns in the longitudinal transformer 210 and avoids DC saturation. This is not true with individual inductors. Also some leakage inductance in the longitudinal transformer 210 may be desirable to increase the impedance or inductance in the desired signal path. This can be achieved by decreasing the coupling between the coils 212 and 214.

The second clamping circuitry 204 includes a pair of bi-directional solid state transient voltage suppressors 232 and 234 connected in series and connected at a junction of the suppressors 232 and 234 to ground. The bi-directional solid state transient voltage suppressors 232 and 234 are connected in series between the lines TIP and RING by a pair of shunt capacitors 236 and 238. The bi-directional solid state transient voltage suppressors 232 and 234 can be provided with bi-directional solid state Zener diodes or a device type sold by General Semiconductor Industries, Inc. under the trademark TranZorb. Alternatively, the bi-directional solid state transient voltage suppressors 232 and 234 can be a bi-directional solid state crowbar clamping diode having a stand off voltage, typically 5–70 volts, above the maximum signal or data voltage but below the other system operating voltages, for example, the ring voltage or DC loop voltage. A pair of resistors 242 and 244 connected in series with the lines TIP and RING form a low pass filter with the shunt capacitors 236 and 238. For example, each of the resistors 242 and 244 can be a 10 Ω resistor. Each of the capacitors 236 and 238 can be, for example, 0.33 $\mu$F.

The longitudinal transformer 210 is arranged for increasing the impedance of the series elements or resistors 242 and 244 with respect to transient voltages occurring between TIP line and GROUND and RING line and GROUND, while not increasing the impedance of the series elements 242 and 244 with respect to normal data signals passing into the system termination and equipment.

During normal operation, the desired data signals between TIP line and GROUND and RING line and GROUND have a voltage less than the selected rated conduction voltage for the bi-directional solid state transient voltage suppressors 232 and 234. The bi-directional solid state transient voltage suppressors 232 and 234 remain non-conducting and the only signal shunted to ground is via the junction capacitance of the bi-directional solid state transient voltage suppressors 232 and 234, typically 100 pf–500 pf. The system termination, for example, 600 Ω termination across the TIP and RING completes the signal path via the two series impedance resistors 242 and 244.

Overvoltage and transient signals between TIP line and GROUND and RING line and GROUND have a voltage greater than the selected rated conduction voltage for the bi-directional solid state transient voltage suppressors 232 and 234. The bi-directional solid state transient voltage suppressors 232 and 234 conduct, connecting the respective shunt impedance or capacitors 236 and 238 to ground for the duration of the transient voltages. The series and shunt impedance elements, resistors 242 and 244, longitudinal transformer windings 212 and 214 and capacitors 236 and 238, form the low pass filter to attenuate the transient signals and to reduce the edge speed of the transient signals.

In brief summary, advantages of the present invention provided with the longitudinal transformer 210 include increased impedance to longitudinal tip and ring currents; and therefore improved filtering to transient voltage between TIP line and GROUND and RING line and GROUND. It also results in an increase in the transient voltage across the first clamping device 206 to ground causing the first clamping device 206 to fire more promptly. Legitimate or desired signal loop currents are not attenuated by the longitudinal transformer 210 since the net flux in the core 216 is zero and therefore the impedance is negligible or a very small impedance due to winding resistance and leakage inductance. The longitudinal transformer 210 provides equal impedance into the tip and ring paths, to preserve the balanced characteristics of the telephone line pair.

While the present invention has been described with reference to the details of the embodiments of the invention shown in the drawing, these details are not intended to limit the scope of the invention as claimed in the appended claims.

What is claimed is:

1. An apparatus for protecting a pair of telephone lines from overvoltage and transients comprising:

means for filtering noise and transient voltage signals above desired data signals on telephone lines, said filter means including first clamping means for conducting current at a first breakdown voltage and for blocking current below the first breakdown voltage; second clamping means for conducting current at a second breakdown voltage and for blocking current below the second breakdown voltage; and a longitudinal transformer coupled to the telephone lines between said first clamping means and said second clamping means;

said longitudinal transformer including;

a single transformer core; and a pair of coils, a first one of said coils connected in series with a first telephone line; and a second one of said coils connected in series with a second telephone line;

said pair of coils being substantially identical; each coil having an identical number of turns; and said pair of coils having an identical direction of winding on the transformer core.

2. An apparatus for protecting a pair of telephone lines from overvoltage and transients as recited in claim 1 wherein said pair of coils are phased so that said desired data signals on telephone lines flowing in opposite directions through said coils produce a net zero magnetic flux in said single transformer core, thereby providing a low impedance to said desired data signals.

3. An apparatus for protecting a pair of telephone lines from overvoltage and transients as recited in claim 1 wherein said pair of coils are phased so that longitudinal noise and transient voltage signals on telephone lines flowing in the same direction through said coils produce additive magnetic fluxes in said single transformer core, thereby providing a high impedance to said longitudinal noise and transient voltage signals.

4. An apparatus for protecting a pair of telephone lines from overvoltage and transients as recited in claim 1 wherein said pair of coils are provided in close proximity on said single transformer core, whereby leakage inductance is minimized.

5. An apparatus for protecting a pair of telephone lines from overvoltage and transients as recited in claim 1 wherein said single transformer core is formed of a ferrite material.

6. An apparatus for protecting a pair of telephone lines from overvoltage and transients as recited in claim 1 wherein said longitudinal transformer includes a third coil.

7. An apparatus for protecting a pair of telephone lines from overvoltage and transients as recited in claim 6 wherein said third coil includes a set number of turns.

8. An apparatus for protecting a pair of telephone lines from overvoltage and transients as recited in claim 6 further includes external components coupled to said third coil.

9. An apparatus for protecting a pair of telephone lines from overvoltage and transients as recited in claim 8 wherein said external components provide a shunt impedance including at least one of a resistor, a capacitor and an inductor.

10. A method for protecting a pair of telephone lines from overvoltage and transients comprising the steps of:

providing a filter for filtering noise and transient voltage signals above desired data signals on telephone lines, said filter including first clamping means for conducting current at a first breakdown voltage and for blocking current below the first breakdown voltage; second clamping means for conducting current at a second breakdown voltage and for blocking current below the second breakdown voltage; and a longitudinal transformer coupled to the telephone lines between said first clamping means and said second clamping means;

providing said longitudinal transformer with a single transformer core; and a pair of coils, a first one of said coils connected in series with a first telephone line; and a second one of said coils connected in series with a second telephone line; said pair of coils being substantially identical; each coil having an identical number of turns; and said pair of coils having an identical direction of winding on the transformer core;

providing, with said longitudinal transformer, high impedance to longitudinal noise and transient voltage signals; and providing, with said longitudinal transformer, low impedance to desired data signals.

11. A method for protecting a pair of telephone lines from overvoltage and transients as recited in claim 10 wherein said step of providing, with said longitudinal transformer, high impedance to longitudinal noise and transient voltage signals; includes the step of phasing said pair of coils so that longitudinal noise and transient voltage signals on telephone lines flowing in the same direction through said coils produce additive magnetic fluxes in said single transformer core, thereby providing a high impedance to said longitudinal noise and transient voltage signals.

12. A method for protecting a pair of telephone lines from overvoltage and transients as recited in claim 10 wherein said step of providing, with said longitudinal transformer, low impedance to desired data signals; includes the step of phasing said pair of coils so that said desired data signals on telephone lines flowing in opposite directions through said coils produce a net zero magnetic flux in said single transformer core, thereby providing a low impedance to said desired data signals.

* * * * *